Dec. 31, 1946.   W. F. MITCHELL   2,413,574
BORING MACHINE
Filed Sept. 9, 1944   5 Sheets-Sheet 3
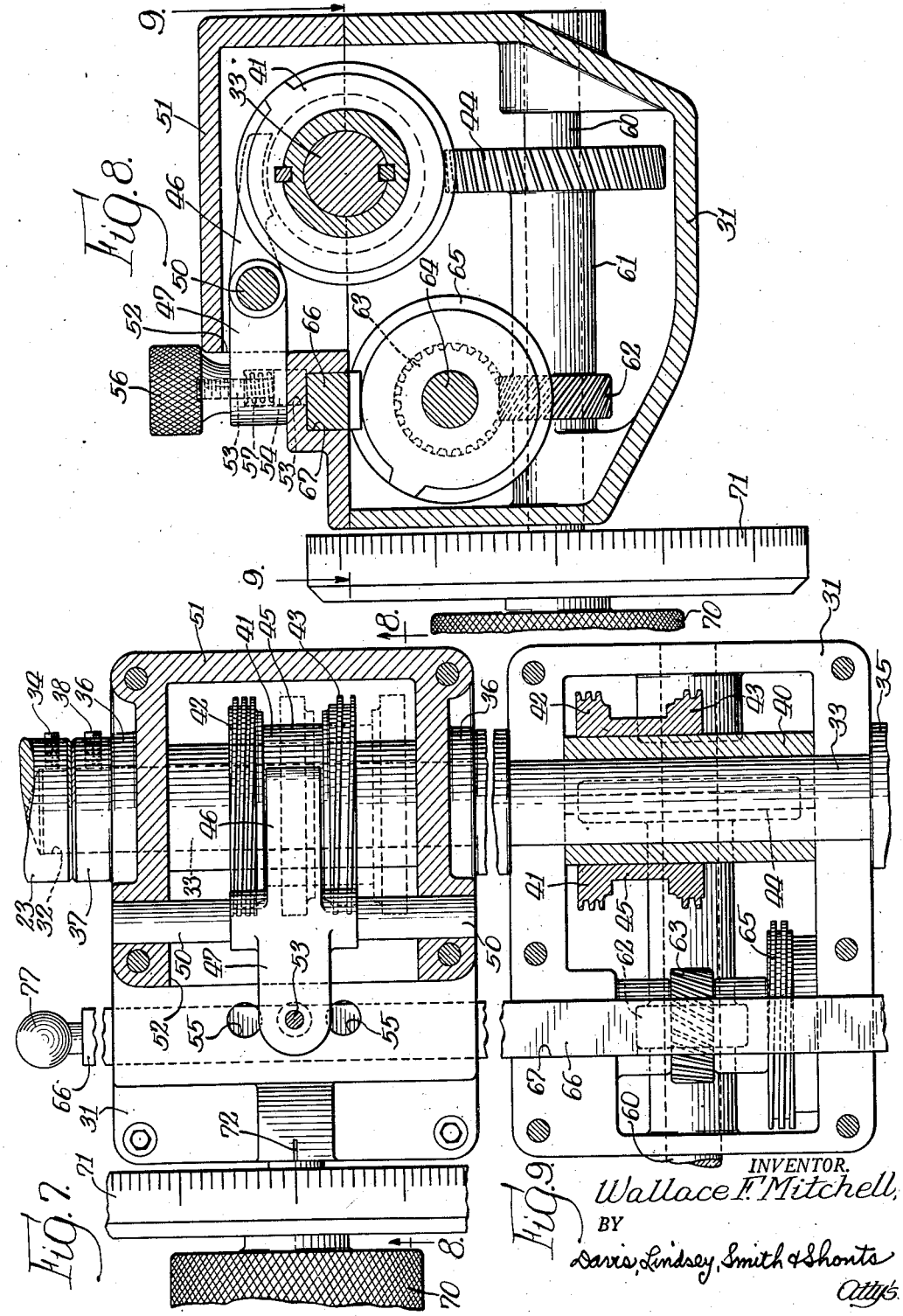
INVENTOR.
Wallace F. Mitchell,
BY
Davis, Lindsey, Smith & Shonts
Attys.

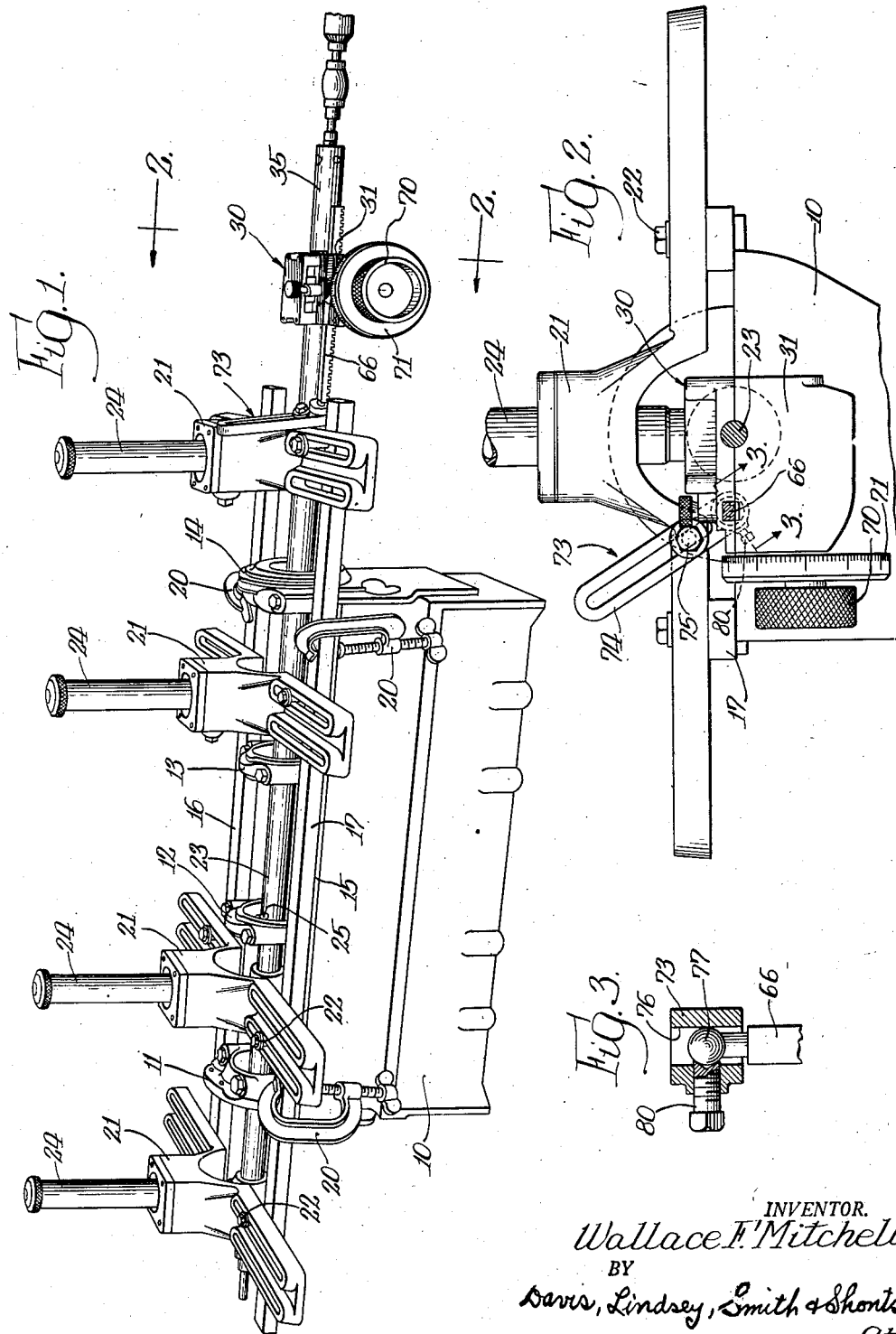

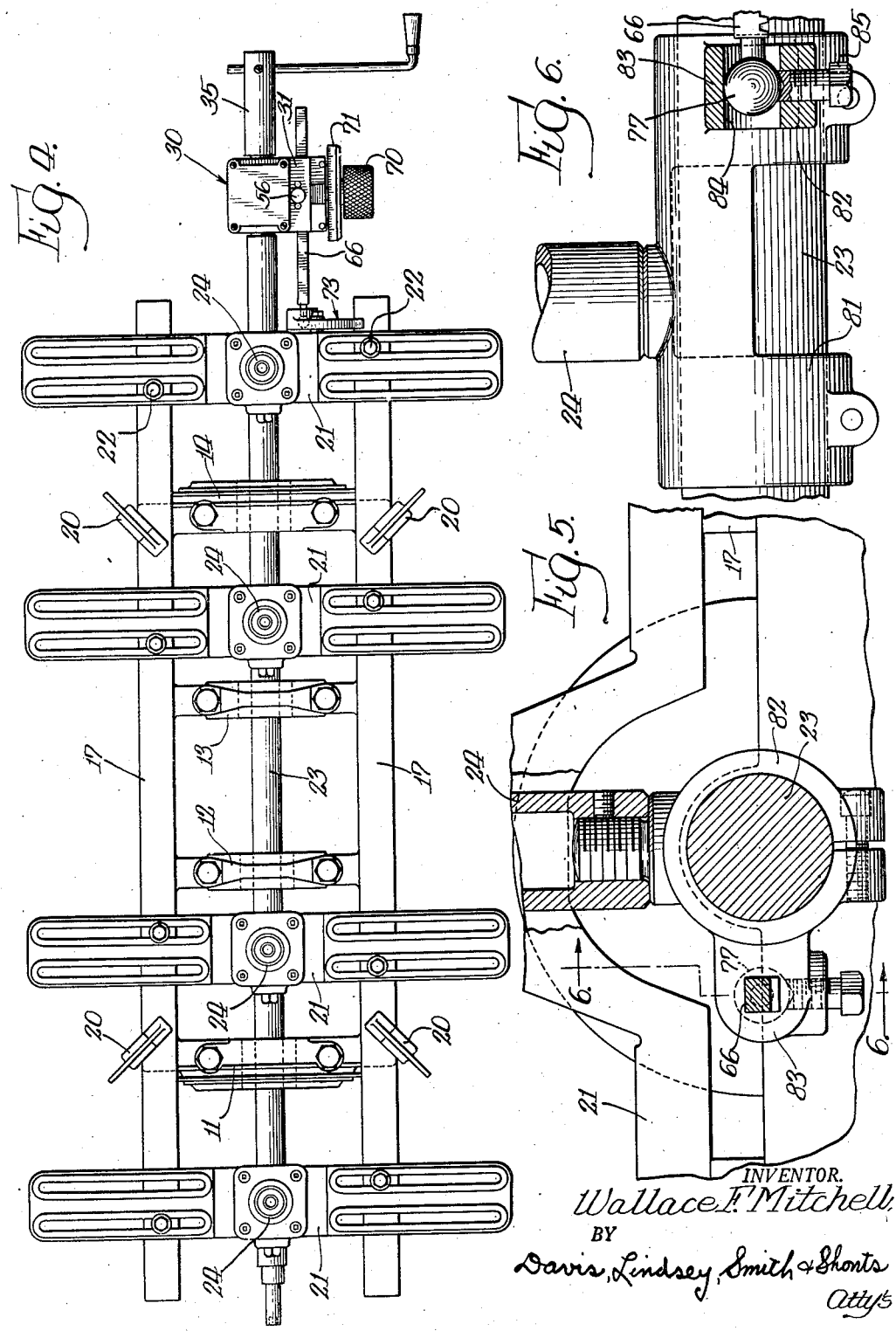

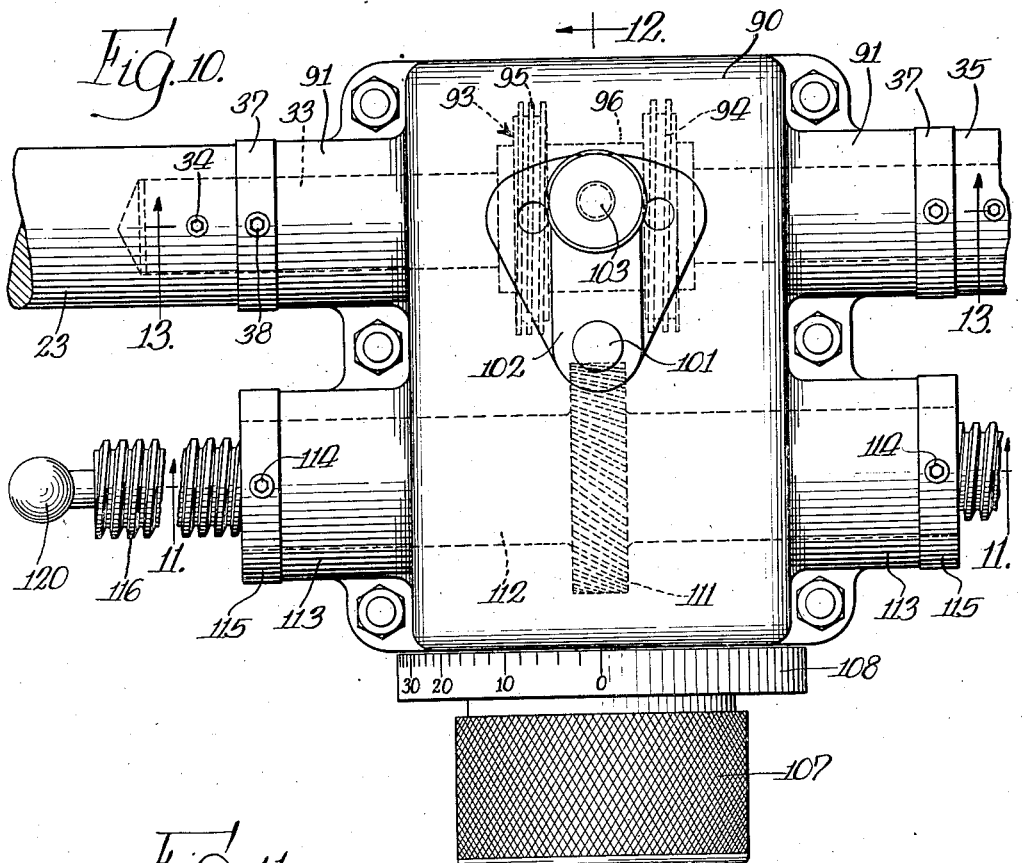
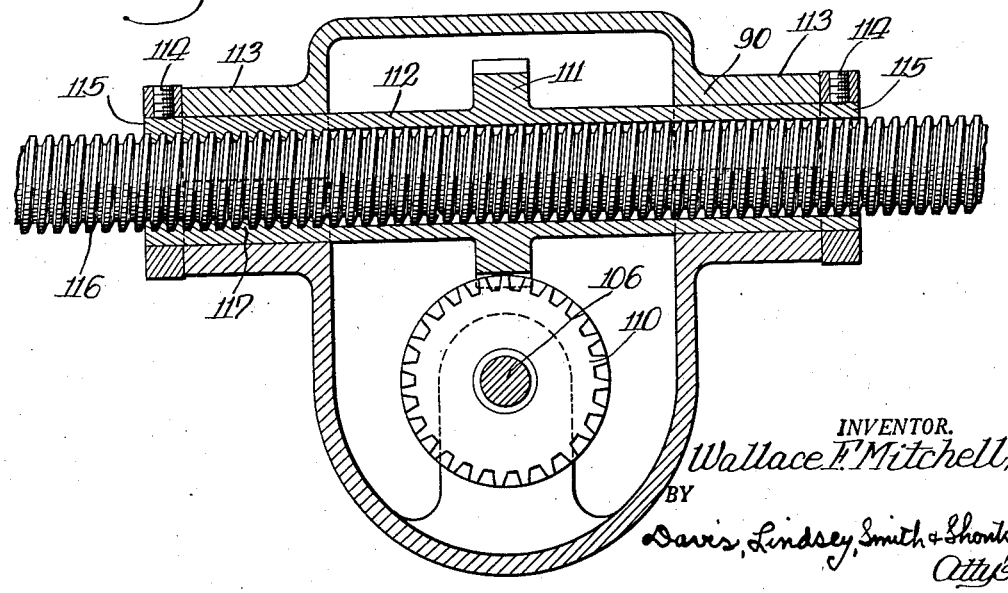

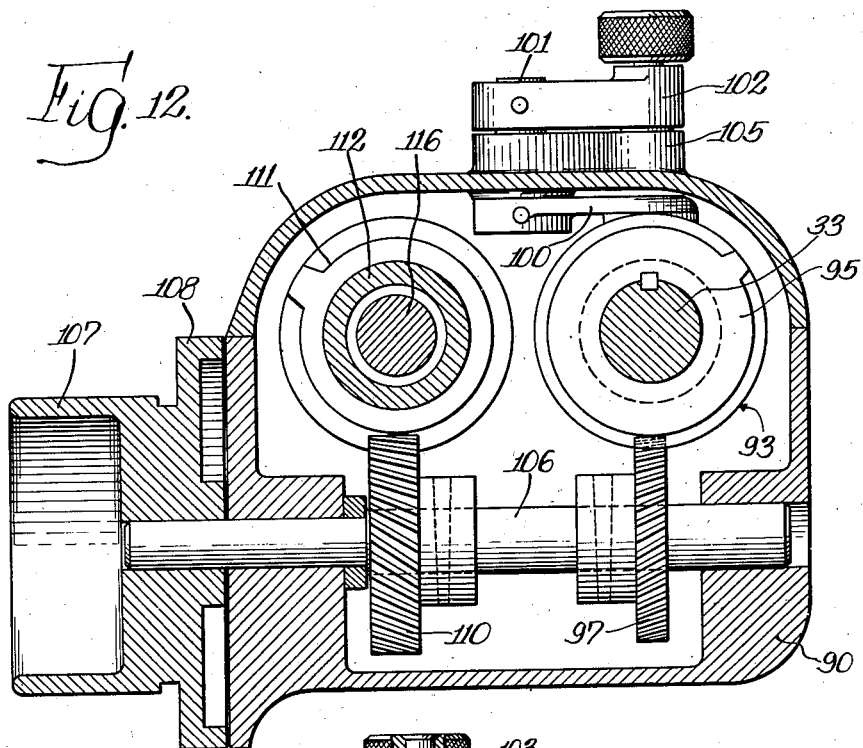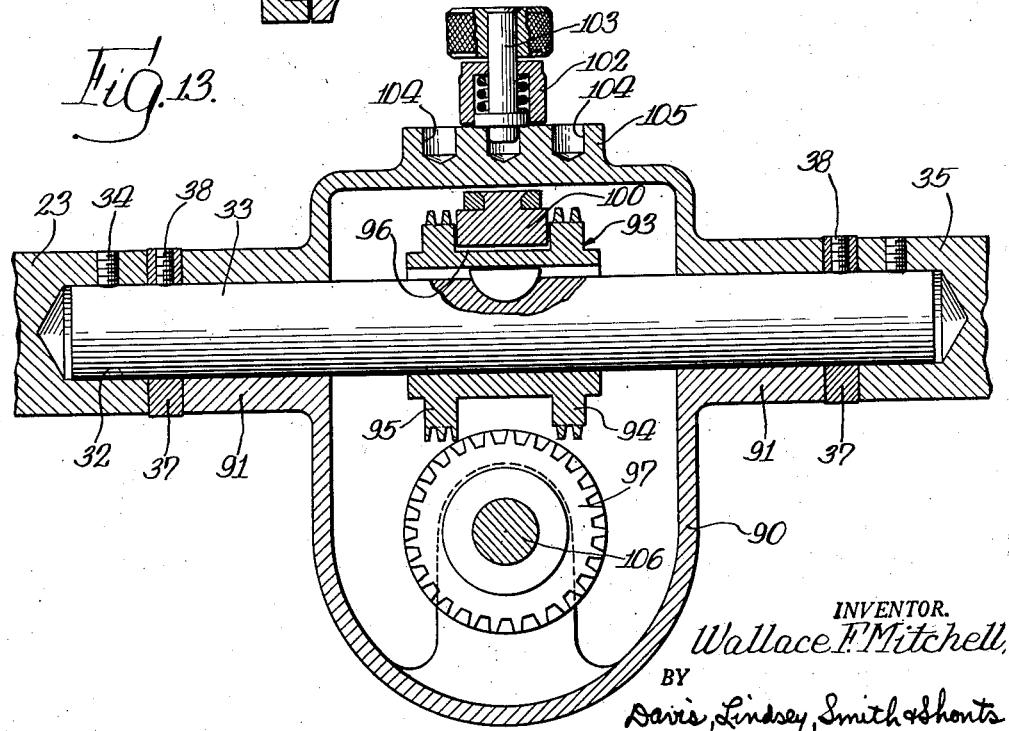

Patented Dec. 31, 1946

2,413,574

UNITED STATES PATENT OFFICE 2,413,574

BORING MACHINE

Wallace F. Mitchell, Chicago, Ill., assignor to Automotive Maintenance Machinery Co., North Chicago, Ill., a corporation of Illinois Application September 9, 1944, Serial No. 553,320

15 Claims. (Cl. 77—2)

The invention relates generally to boring machines and more particularly to a boring machine for boring one or more of a plurality of so-called in-line bearings such as the cam shaft and crankshaft bearings in the cylinder block of an internal combustion engine.

The general object of the invention is to provide a boring machine of the foregoing character having a novel power driven feed device of simple construction, which provides for positive uniform feeding of the boring tool through the work.

Another important object is to provide a boring machine of this character having a novel feed device providing a positive power feed of the boring tool for certain types of work and having a manually operated member for effecting the feed for other types of operations performed by the machine.

Still another object is to provide a boring machine having a novel feed device adapted selectively to provide a power feed or to permit manual operation of the feed, with an indicator for showing the extent of the feed when manually operated.

It is also an object to provide a boring machine having a feed device arranged to provide different feed rates for the boring bar suitable for roughing cuts or finishing cuts.

A further object is to provide a boring machine having a novel feed device providing for power feed of the boring bar at two different rates and for manual operation of the feed, the device being provided with a single shifting member movable to different positions for effecting the respective feed rates or for manual operation.

A still further object is to provide a boring machine provided with a novel feed device which has no tendency to cause any materal distortion of the boring bar when in operation.

Still another object is to provide in a boring machine of the type adapted to be mounted on and carried by the work when in operation, a novel feed device constructed to be carried and driven by the boring bar and effecting a positive uniform feed of the bar without distortion thereof to produce a highly accurate cut.

Other objects and advantages will become apparent from the following description taken in connection with the accompanying drawings, in which:

Figure 1 is a perspective view of a boring machine provided with a feed device embodying the features of the invention.

Fig. 2 is a vertical sectional view taken on the line 2—2 of Fig. 1.

Fig. 3 is a fragmentary sectional view taken on the line 3—3 of Fig. 2.

Fig. 4 is a plan view of the machine.

Fig. 5 is a fragmentary view partially in section showing a modified form of one of the supports for the machine.

Fig. 6 is a fragmentary vertical sectional view taken on the line 6—6 of Fig. 5.

Fig. 7 is a plan view partially in section, on an enlarged scale, showing the feed device.

Fig. 8 is a vertical sectional view taken on the line 8—8 of Fig. 7.

Fig. 9 is a sectional view taken on the line 9—9 of Fig. 8.

Fig. 10 is a plan view of a modified form of feeding device.

Fig. 11 is a sectional view taken on the line 11—11 of Fig. 10.

Fig. 12 is a sectional view taken on the line 12—12 of Fig. 10.

Fig. 13 is a sectional view taken on the line 13—13 of Fig. 10.

The present application is a continuation-in-part of my copending application Serial No. 479,579, filed March 18, 1943.

As mentioned above, a machine having a feed device embodying the features of the invention is of the type arranged for boring one or more of a plurality of so-called in-line bearings such as the cam and crankshaft bearings in the cylinder block of an internal combustion engine. More particularly, the machine disclosed herein is of such character that it is adapted to be mounted directly on such a cylinder block and to be carried thereby during operation. The machine may also be used for boring a series of in-line bearings or a bearing having a definite alignment with some other point, such as shaft or spindle bearings in machine tools.

As shown in the drawings, the cylinder block, indicated at 10, is provided with a plurality of line bearings, indicated at 11, 12, 13 and 14 (see Figs. 1 and 2), which are to be bored by the machine disclosed herein. For this purpose the cylinder block is inverted so that the bearings are upward, and the machine is adapted to be mounted on and secured to the crank shaft pan rails 15 of the cylinder block. The boring operation is adapted to be performed with the caps of the various bearings and the bearing inserts in assembled relation with the cylinder blocks without necessitating their removal at any time.

The machine comprises a pair of parallel rails 16 and 17 adapted to be mounted on the pan rails 15 and secured thereto by means such as C-clamps 20. The clamps 20 thus hold the rails rigidly on the cylinder block and in spaced parallel relation to each other. Connecting the rails 16 and 17 is a plurality of bridge members 21 rigidly secured to the rails as by screws 22 in spaced relation along the rails. Preferably the bridge members 21 are so located that there is one of them at each end of the rails beyond the ends of the cylinder block and other bridge members are located intermediate the bearings 11, 12, 13 and 14 to provide rigid supports therebetween.

Rotatably carried by the bridge members is a boring bar 23 extending through the various bearings 11, 12, 13 and 14 and beyond the ends of the cylinder block. The boring bar 23 is supported by each of the bridge members 21, and to this end each bridge member is provided with an upright 24 adjustably mounted in the bridge member and provided with a bearing at its lower end in which the boring bar 23 is journaled. In setting up the machine, after the rails 16 and 17 are clamped to the cylinder block and the bridge members 21 are secured to the rails by the screws 22, the boring bar is preferably aligned or centered with the two end bearings 11 and 14 of the cylinder block by means of a centering device such as is shown in my parent application. When the boring bar is so centered, the uprights 24 of the two end bridge members are then clamped in place to rigidly hold the boring bar in its aligned position. Thereafter, the uprights 24 of the intermediate bridge members are camped in place to support the boring bar in the position determined by the uprights 24 of the two end bridge members. The boring bar will thus be supported in such a manner as to bore all of the bearings 11, 12, 13 and 14 in true axial alignment with each other.

The boring bar 23 is provided with a plurality of apertures (not shown) at spaced points along its length to receive a radially extending boring tool, such as shown at 25 in Figure 1 where it is in position for boring the bearing 12. The boring tool or bit 25 is adapted to be set to the proper radial distance to bore the correct diameter, by means of a micrometer setting device such as is disclosed in my parent application.

The boring is effected by rotatably driving the boring bar 23 and moving it longitudinally during such rotation to effect a feed of the boring tool or bit 25. To this end a feeding device, indicated generally at 30, is provided, which in its preferred form is adapted to be mounted on and carried by either end of the boring bar and is so constructed that a power driven feeding movement may be accomplished by power derived from the rotation of the boring bar, or such power drive may be disconnected to permit manual operation of the feeding device 30. In its preferred form, the feeding device 30 is so constructed that the power feed of the boring bar may be accomplished at two different rates of movement, one rate being such as is suitable for rough boring and the other rate being suitable for finish boring, the latter therefore being substantially slower than the former.

In one preferred form, the feed device 30 comprises a casing 31 (see Figs. 7, 8 and 9) containing gearing adapted to be driven by the boring bar to effect the feed. To support the feed device on the boring bar, each end of the bar is provided with a socket 32 adapted to receive a drive shaft extension comprising a first shaft section 33 extending into the socket 32 and rigidly secured therein as by a set screw 34 radially threaded into the boring bar 23. On the outer end of the first shaft section 33 is a second shaft section 35 connected to the first section 33 in the same manner as the latter is connected to the boring bar, i. e., by providing a socket in the second shaft section 35 to receive the end of the section 33 with a set screw to clamp the two together. The second shaft section 35 is so constructed at its outer end that a source of power such as an electrically operated portable power tool or a hand crank may be connected thereto.

Mounted on the first shaft section 33 is the feed device, the casing 31 of which is provided at its two sides with bearings 36 to rotatably receive the shaft section 33. Mounted on the shaft section 33 in abutting relation with the two bearings 36 are thrust collars 37 which are rigidly secured to the shaft section 33 by means of set screws 38. The shaft section 33 is longitudinally dimensioned so that the thrust collars 37 respectively abut against the end faces of the boring bar 23 and the second shaft section 35. Thus the thrust of the feeding movement provided by operation of the feeding device is exerted against the end of the boring bar 23 in one direction or against the second shaft extension 35 in the other direction to effect feed of the boring bar in opposite directions.

As shown herein, the first shaft extension 33 has a sleeve 40 mounted thereon and keyed thereto, located within the gear casing 31. Mounted on the sleeve 40 and slidably longitudinally thereof but keyed thereto so that it will rotate with the sleeve 40 is a gear 41. The gear 41 comprises a pair of gear sections 42 and 43 in spaced relation to each other. Both gear sections are of the worm gear type but the gear section 42 has a single thread while the gear section 43 has a double thread. The two gear sections 42 and 43 are adapted to be selectively moved into mesh with a helical gear 44. To effect such shifting movement of the gear sections, the space between the gear sections constitutes an annular groove 45 to receive a tongue portion 46 on a shifting member 47. The shifting member 47 is slidably mounted on a rod 50 rigidly mounted in a cover portion 51 for the gear casing 31. The shifter member 47 extends forwardly from the rod 50 through an opening 52 in the front wall of the cover 51. In order to hold the shifter member 47 in the various positions to hold the gear sections 42 and 43 in mesh with the helical gear 44 or to hold both of such gear sections out of mesh therewith, the shifter member 47 is provided with a locking means comprising a plunger 53 extending through the outer end of the shifter member and provided with a head 54 adapted to enter any one of three apertures 55 formed on the adjacent surface of the cover 51. At its upper end, the plunger 53 is provided with a knob 56, and a coil spring 57 surrounds the plunger 53 above the head 54 and tends to move the head 54 into any one of the apertures 55. Thus the shifter member 47 may be locked in position to hold the gear section 42 in mesh with the helical gear 44 or to hold the gear section 43 in mesh therewith, or the shifter member may be locked in a position where both the gear sections 42 and 43 are out of mesh with the helical gear 44. By this construction, the drive from the first shaft section 33 may be transmitted to the helical gear 44 at two different rates depending upon whether the gear section 42 or the gear section 43 is in mesh therewith, or the drive may be disconnected from the helical gear 44 when both of the gear sections are held out of mesh.

The helical gear 44 is mounted on a stub shaft 60 positioned in the lower part of the casing 31 and extending through the front wall thereof. As shown herein, the helical gear 44 is rigid with a sleeve 61 carried on the stub shaft 60 and having at its forward end a spiral gear 62 driven thereby. The spiral gear 62 meshes with a second spiral gear 63 carried on a stub shaft 64 extending transverse to the stub shaft 60. Also carried on the stub shaft 64 is a rotary feed member in the form of a worm gear 65 rotatable with the spiral gear 63 and meshing with a feed bar in the form of a rack 66 extending through the gear casing 31. The rack 66 is slidably supported in a groove 67 in the cover 51 of the gear casing and is supported both horizontally and vertically through a substantial portion of its length by the groove 67 so that the gear casing 31 and the rack 66 are held in fixed alignment.

The rack 66 extends toward and is adapted to be secured to the adjacent bridge member 21 to hold the rack against longitudinal movement. Thus when the gearing within the casing 31 is driven, the feed device will be caused to move longitudinally of the rack, and such movement is transmitted to the boring bar through the thrust collars 37 rigidly secured on the first shaft section 33 and abutting the end of the boring bar and the second shaft section 35. The direction of feed, of course, is determined by the direction of rotation of the first shaft extension 33, and the rate of movement is determined by the gear sections 42 or 43, depending upon which is in mesh with the gear 44.

Power operation of the feed device is utilized chiefly when the internal diameters of the cylinder block bearings are being bored. The machine, however, may be used for facing the ends of these bearings, and in such case only a small amount of metal is, as a rule, necessary to be removed. Therefore, the feed in such instance is preferably accomplished by hand. For this purpose, the shifter member 47 is moved to its intermediate position so that both the gear sections 42 and 43 are out of mesh with the helical gear 44 to disconnect the power drive from the latter. The stub shaft 60, as mentioned above, extends through the front wall of the gear casing 31 and on its front end is provided with a hand wheel or knob 70 by which the stub shaft 60 may be rotated. Thus manual rotation of the hand wheel 70 will effect drive of the spiral gear 62 to drive the spiral gear 63 and the worm gear 65 meshing with the rack 66.

In performing such operations as facing the bearings on the cylinder block, it is desirable to be able to determine accurately the amount of feed of the facing tool. To this end, the hand wheel 70 is provided with a dial 71 rotatable therewith and carrying on its periphery indicia cooperating with a fixed mark 72 on the adjacent portion of the casing cover 51 to indicate the extent of movement of the boring bar. The indicia on the periphery of the dial 71 are preferably calibrated to indicate the number of thousandths of an inch that the boring bar moves or is fed. Thus the operator can see at a glance the exact amount of metal that the facing tool removes in its operation. The hand wheel 70 and the dial 71, since they are mounted on the stub shaft 60, also rotate during the power feed of the device and thus give a clear indication to the operator of the rate of such feed.

As mentioned above, the rack 66 is adapted to be secured against endwise movement. To this end the rack bar may be secured to any fixed part of the machine. In the form shown in Figs. 1 to 4 of drawings, the end of the rack bar is adapted to be secured to the adjacent head 21 by means of an adjustable bracket, indicated generally at 73, secured to the bridge member 21. The bracket in its preferred form comprises an elongated slotted portion 74 (see Fig. 2) secured to the bridge member 21 as by a screw 75, the slot in the portion 74 permitting the bracket to be adjusted so that the rack 61 is in proper alignment with the bearing surfaces provided by the groove 67 in the cover 51 of the feed device. On one end of the bracket 73 is a socket 76 (see Fig. 3) to receive the end of the rack bar 66. In its preferred form, the end of the rack bar is ball shaped as indicated at 77 and the ball-shaped portion 77 is adapted to be clamped in the socket 76 as by a set screw 80 having a conical depression in its end fitting over the ball to prevent the ball from pulling out of the socket. By providing the ball-shaped end, difficulties in aligning the socket and rack bar with the boring bar are avoided. Thus, the ball-shaped end 77 of the rack bar permits the rack bar to shift into proper alignment with the bearing surfaces in the gear casing cover 51 and when clamped holds the rack bar against longitudinal movement.

In the structure shown in Figs. 5 and 6 of the drawings, the upright 24 is provided with a pair of spaced bearings 81 and 82 to support the boring bar 23 at spaced points. Thus a particularly rigid support for the boring bar is provided which prevents any flexing thereof due to the thrust of the feed device 30. The boring bar thus may be held in properly centered position with relation to the bearings in the cylinder block which are being bored, and the thrust effected by the feed device will be prevented from any tendency to move the boring bar out of alignment with these bearings.

With this form of upright 24 in the bridge member 21 adjacent the feeding device, the bracket 73 may be eliminated, and the end bearing 82 of the bracket 24 may be provided with means for holding the end of the rack bar 66 against longitudinal movement. Thus the bearing 82 may be provided with a short arm 83 extending to one side thereof and provided with a socket 84 to receive the ball-shaped end 77 of the rack bar 66. The ball-shaped end 77 is clamped in the socket 84 as by a set screw 85 similar to the set screw 80.

The modified form of feed device shown in Figs. 10 to 13, inclusive, differs from the first form principally in the form of feed bar utilized. In this form the feed bar is a screw instead of a rack bar. This form of feed device also differs in the construction of the means for shifting the drive gears.

As shown in Figs. 10 to 13, this form of feed device comprises a casing 90 provided with a pair of oppositely extending bearing portions 91 integral with the casing and rotatably supporting the shaft section 33. Mounted on the shaft section 33 within the casing 90 is a gear, indicated generally at 93, and comprising a pair of gear sections 94 and 95 in spaced relation with each other to provide a groove 96 therebetween. The gear 93 is keyed to the shaft section 33 but is slidable longitudinally thereof. The gear sections 94 and 95 are of the worm gear type but, similar to the gear sections in the first form, one has a single thread and the other has a double thread. The gear sections 94 and 95 are adapted to be selectively moved into mesh with a helical gear 97.

To effect shifting movement of the gear sections, a shifting lever 100 is pivotally supported on the upper wall of the casing by means of a pivot pin 101 and extends into the groove 96. The pivot pin 101 extends upwardly through the upper wall of the casing and on the upper end thereof is secured a hand lever 102. The hand lever 102, at its free end, is provided with a spring-pressed pin 103 adapted to seat in any one of three holes 104 provided in a boss 105 formed on the upper face of the top wall of the casing. Thus, by shifting the hand lever 102 and permitting the spring-pressed pin 103 to engage in any one of the holes 104, the shifting lever 100 will cause either one of the gear sections 94 and 95 to be moved into or out of mesh with the helical gear 97 or will move both of them out of engagement therewith.

The helical gear 97 is rigidly secured on a stub shaft 106 journaled in the walls of the casing and extending forwardly through the front wall to receive a hand wheel 107 and a dial 108. Also rigidly secured on the stub shaft 106 within the casing is a spiral gear 110 adapted to mesh with a second spiral gear 111 rigid with a sleeve 112. Preferably, the spiral gear 111 is formed integrally with the sleeve 112.

The sleeve 112 is journaled in bearing portions 113 formed integrally with the walls of the casing, the sleeve having a length to extend slightly beyond both the bearing portions 113. Rigidly secured on the ends of the sleeve 112, as by set screws 114, are thrust collars 115 abutting the outer end faces of the bearing portions 113 to prevent the sleeve 112 from moving longitudinally relative to the casing.

The sleeve 112, in this form of feed device, constitutes the rotary feed member to cooperate with a feed bar in the form of a screw 116. To provide for engagement between the sleeve 112 and the screw 116, an end portion 117 of the sleeve 112 is internally threaded to form a nut engaging the threads of the screw 116. Thus, when the sleeve 112 is rotatably driven by its gear 111, the threaded portion 117 causes the feed device to be moved along the screw 116 and thus feed the boring bar 23. The end of the screw 116 is provided with a ball-shaped portion 120 similar to the rack bar in the first form of the device, which ball-shaped portion is adapted to be attached to the machine either in the manner shown in Fig. 2 of the drawings or in the manner shown in Figs. 5 and 6 of the drawings. The ball-shaped portion 120 facilitates alignment as in the first form of the device, and when it is clamped by the screw, it is held against rotation so that a feed may be effected. In order to hold the feeding device in proper alignment with the screw 116 to prevent any tendency to flex the boring bar 23, the sleeve 112 for the portion thereof beyond the threaded portion 117 has an internal bore fitting snugly on the screw 116 and forming a bearing therefor. Thus, the screw 116 is supported by the full length of the sleeve 112 and proper alignment between the feeding device and the screw is thereby insured.

From the foregoing description it will be evident that I have provided a novel feed device for a boring machine of the character disclosed herein, which feed device is of simple construction and provides for positive uniform feeding of the boring tool through the work. The feed device is arranged so that it may be driven by power derived from the rotation of the boring bar at either of two rates of feed, one being suitable for rough boring and the other being suitable for finished boring. The feed device may also be operated by hand, the power feed usually being utilized for such work as boring the internal diameters of the bearings of the cylinder block while the hand operation of the feed device is preferably utilized for such work as facing the ends of the bearings. In the case of manual operation of the feed devices, the extent of feed is visually indicated by means of the dial, which is calibrated to indicate the feed of the boring tool in thousandths of an inch. The feed device may be readily changed for feeding at the different rates or for manual operation merely by movement of the shifter member, the latter being locked when in each of its three positions. The feeding movement is free of any tendency to distort or cause a misalignment of the boring bar, since the rack 66 or screw bears in the gear casing at points spaced a substantial distance apart along the rack 66 or screw. The bearings in the gear casing, which support the gear casing on the first shaft section 33, also tend to hold the feed device in proper alignment with the boring bar, since the bearings are spaced a substantial distance apart, and the shaft section 33 is rigidly secured in the end of the boring bar.

I claim:

1. In a machine for boring the bearings of an engine cylinder block, a boring bar, means for supporting said boring bar in centered relation to the bearings to be bored, means for rotating said boring bar, and means for feeding said boring bar forwardly as it is rotated which comprises a casing carried by and shiftable with said boring bar, a rack bar secured at one end to said supporting means, a gear carried by said casing and connected to said rack, a gear carried by said casing and connected to said boring bar and shiftable relative thereto, intermediate gear means carried by said casing and disposed between said bar and rack gears and constantly connected to said rack gear, means carried by said casing for shifting said bar gear to engage and disengage the same from said intermediate gear means, and means for manually rotating said intermediate gear means to rotate said rack-connected gear when said bar gear is disengaged from said intermediate gear means, the arrangement being such that when said bar-connected gear is connected to said intermediate gear means said boring bar is fed by its own rotation, and when said latter-mentioned gear means are disengaged the boring bar is fed forwardly only by rotation of said manual means through said casing.

2. In a machine for boring the bearings of an engine cylinder block, a boring bar, means for supporting said boring bar in centered relation to the bearings to be bored, means for rotating said boring bar, and means for feeding said boring bar forwardly as it is rotated which comprises a casing carried by and shiftable with said boring bar, a rack bar secured at one end to said supporting means, a gear carried by said casing and connected to said rack so as to feed forwardly and carry said casing with it when it is rotated, a gear carried by said casing and having a fast feed and a slow feed section slidably but non-rotatably connected to said boring bar, an intermediate gear means carried by said casing and constantly connected to said rack-engaged gear, means for slidably shifting said bar-connected gear to connect either its fast or slow feed section to or disconnect both from said intermediate gear means, the arrangement being such that when said bar-connected gear and intermediate gear means are connected the boring bar is fed forwardly by its own rotation, and manual means carried by said casing for rotating said intermediate gear means and in turn said rack-engaged gear to feed said casing and boring bar forwardly when said bar-connected gear is disconnected from said intermedaite gear means.

3. In a machine for boring the bearings of an engine cylinder block, a boring bar, means for supporting said boring bar in centered relation to the bearings to be bored, means for rotating said boring bar, and means for feeding said boring bar forwardly as it is rotated which comprises a rack bar, a universal connection between one end of said rack bar and said supporting means, the other end of said rack bar passing slidably through said casing, a first gear in said casing directly connected to said boring bar and mounted for sliding movement longitudinally thereof, said first gear having a fast and a slow feed section, a second gear in said casing connected to said rack bar so that when it is rotated said casing and boring bar are moved forwardly or vice versa, intermediate gear means in said casing constantly connected to said second gear, means for shifting said first gear to engage either its fast or slow speed section with said intermediate gear means or to wholly disengage it therefrom, means for releasably latching said shifting means in either of its shiftable positions, and manual means for rotating said intermediate gear means when it is disengaged from said first gear, including calibrated means for determining the extent of movement of said manual means and in turn the extent of manual feed of said boring bar.

4. In a machine for boring the bearings of an engine cylinder block, a boring bar, means for supporting said boring bar in centered relation to the bearings to be bored, means for rotating said boring bar, and means for feeding said boring bar forwardly as it is rotated which comprises a rack bar, a universal connection between one end of said rack bar and said supporting means, the other end of said rack bar passing slidably through said casing, a first gear in said casing directly connected to said boring bar and mounted for sliding movement longitudinally thereof, said first gear having a fast and a slow feed section, a second gear in said casing connected to said rack bar so that when it is rotated said casing and boring bar are moved forwardly or vice versa, intermediate gear means in said casing constantly connected to said second gear, means for shifting said first gear to engage either its fast or slow speed section with said intermediate gear means or to wholly disengage it therefrom, means for releasably latching said shifting means in either of its shiftable positions, an exteriorly accessible hand wheel carried by said intermediate gear means for rotating the latter to feed the boring bar when said first gear is disengaged from said intermediate gear means, a calibrated scale on said wheel indicating feed movement of said boring bar in terms of extent of movement of said wheel, and an indicating means on said casing with respect to which said scale moves to indicate extent of movement of said wheel.

5. A feed device for a machine for boring bearings and including supporting structure and a rotatably driven boring bar, said feed device comprising a pair of gears adapted to be driven by said boring bar, a driven gear, means for selectively shifting said pair of gears into and out of mesh with said driven gear, said pair of gears having different driving ratios with said driven gear, and a feed bar having a driving connection with said driven gear and adapted to be secured against endwise movement relative to said supporting structure.

6. A feed device for a machine for boring bearings and including a rotatably driven boring bar adapted to be longitudinally fed, said feed device comprising a driving gear adapted to be driven by said boring bar and having fast feed and slow feed sections, a driven gear, manually operable shifting means for shifting said driving gear to move either of said sections into mesh with said driven gear or both of said sections out of mesh therewith, and a feed bar having a driving connection with said driven gear and adapted to be secured against endwise movement relative to said machine.

7. A feed device for a machine for boring bearings and including a rotatably driven boring bar adapted to be longitudinally fed, said feed device comprising a worm gear adapted to be driven by said boring bar and having a single thread section and a double thread section, a helical gear, manually operable shifting means for selectively meshing said sections with said helical gear and for moving both of said sections out of mesh therewith, and a feed bar having a driving connection with said helical gear and adapted to be secured against endwise movement relative to said machine.

8. A feed device for a machine for boring bearings and including a rotatably driven boring bar adapted to be longitudinally fed, said feed device comprising a drive member adapted to be driven by said boring bar and having spaced sections at its respective ends for effecting feeds at different rates and having a groove intermediate said sections, a driven gear, a shifter member engaging said drive member in said groove for shifting said drive member to bring one or the other of said sections into mesh with said gear or both out of mesh therewith, and a feed bar having a driving connection with said gear and adapted to be secured against endwise movement relative to said machine.

9. A feed device for a machine for boring bearings and including a rotatably driven boring bar adapted to be longitudinally fed, said feed device comprising a drive member adapted to be driven by said boring bar and having spaced sections for effecting feeds at different rates, a driven gear, a supporting bar extending parallel to said boring bar, a shifter slidably mounted on said supporting bar and engaging said drive member to move it selectively to three positions in which said sections are respectively in mesh with said driven gear or both are out of mesh therewith, means for releasably locking said shifter in any of its three positions, and a rack bar having a driving connection with said driven gear and adapted to be secured to said machine.

10. A feed device for a machine for boring bearings and including a rotatably driven boring bar adapted to be longitudinally fed, said feed device comprising a driving member adapted to be driven by said boring bar, a driven gear adapted to be driven at different speeds by said driving member and to be disconnected therefrom, a shaft supporting said driven gear, a feed bar adapted to be secured to the machine and having a driving connection with said shaft, and manually operable means for rotating said shaft to effect a feed when said driven gear is disconnected from said driving member.

11. A feed device for a machine for boring bearings and including a rotatably driven boring bar adapted to be longitudinally fed, said feed device comprising a casing adapted to be carried by said boring bar, a driving member within said casing adapted to be driven by said boring bar, a driven gear adapted to be driven at different speeds by said driving member and to be disconnected therefrom, a shaft in said casing supporting said driven gear and extending from said casing, a feed bar adapted to be secured to the machine and extending into said casing and having a driving connection with said shaft, a hand wheel mounted on said shaft externally of said casing, and a scale carried by said hand wheel cooperating with a mark on said casing for indicating the length of feed effected by said hand wheel.

12. In a machine for boring bearings and including supporting structure and a boring bar rotatably supported by said structure, the combination of an extension for said boring bar adapted to be connected to a source of power, a feed device carried and driven by said extension and including a feed bar extending toward said structure, and a bracket for holding said feed bar against longitudinal movement, said bracket being adjustably connected to said structure and having a universal connection with said feed bar.

13. In a machine for boring bearings and including supporting structure and a boring bar rotatably supported by said structure, the combination of an extension for said boring bar adapted to be connected to a source of power, a feed device carried and driven by said extension and including a feed bar extending toward said structure and having a ball-shaped end, and a bracket for holding the feed bar against longitudinal movement, said bracket being adjustably connected to said structure and having a socket to receive said ball-shaped end, and means for holding said ball-shaped end in said socket.

14. A feed device for a machine for boring bearings and including a rotatably driven boring bar adapted to be longitudinally fed, said feed device comprising a drive member adapted to be driven by said boring bar and having spaced sections for effecting feeds at different rates, a driven gear, a pivotally mounted shifter engaging said drive member to move it selectively to three positions in which said sections are respectively in mesh with said drive gear or both are out of mesh therewith, means for releasably locking said shifter in any of its three positions, a nut having a driving connection with said driven gear, and a screw engaging said nut and adapted to be secured to said machine.

15. A feed device for a machine for boring bearings and including a rotatably driven boring bar adapted to be longitudinally fed, said feed device comprising a casing adapted to be carried by said boring bar, a driving member within said casing adapted to be driven by said boring bar, a driven member adapted to be driven at different speeds by said driving member and to be disconnected therefrom, a shifting lever within said casing for shifting said drive member, a pivot pin carrying said shifting lever and extending to the exterior of said casing, a hand lever mounted exteriorly on said pivot pin, a nut within said casing rotatably driven by said driven member, and a screw engaging said nut and adapted to be secured to said machine.

WALLACE F. MITCHELL.